(12) United States Patent
Hernandez

(10) Patent No.: US 10,731,700 B2
(45) Date of Patent: Aug. 4, 2020

(54) HIGH ANGULARITY BALL JOINT ASSEMBLY

(71) Applicant: ICON VEHICLE DYNAMICS LLC, Riverside, CA (US)

(72) Inventor: Kristopher Joseph Hernandez, Chino, CA (US)

(73) Assignee: ICON VEHICLE DYNAMICS LLC, Riverside, CA (US)

( * ) Notice: Subject to any disclaimer, the term of this patent is extended or adjusted under 35 U.S.C. 154(b) by 246 days.

(21) Appl. No.: 15/786,489

(22) Filed: Oct. 17, 2017

(65) Prior Publication Data

US 2018/0112705 A1 Apr. 26, 2018

Related U.S. Application Data

(60) Provisional application No. 62/411,348, filed on Oct. 21, 2016.

(51) Int. Cl.
*F16C 11/06* (2006.01)

(52) U.S. Cl.
CPC ........ *F16C 11/0666* (2013.01); *F16C 11/068* (2013.01); *F16C 11/0695* (2013.01); *Y10T 403/32737* (2015.01)

(58) Field of Classification Search
CPC .... B60G 7/005; B60G 2204/416; B62D 7/16; F16C 11/0609; F16C 11/0614; F16C 11/0623; F16C 11/0628; F16C 11/0642; F16C 11/0647; F16C 11/0666; F16C 11/0671; F16C 11/068; F16C 11/069; F16C 11/0695; F16C 11/083; F16C 11/086; F16C 2326/05; F16C 2326/24; Y10T 403/32204; Y10T 403/32713; Y10T 403/32737;
(Continued)

(56) References Cited

U.S. PATENT DOCUMENTS 3,342,513 A * 9/1967 Melton ............... F16C 11/0619
403/77
5,318,373 A * 6/1994 Buhl ..................... B60G 7/005
384/206
(Continued)

FOREIGN PATENT DOCUMENTS

FR 2490750 A1 * 3/1982 .......... F16C 11/0623
GB 1092278 A * 11/1967 ............. B60G 7/005
(Continued)

*Primary Examiner* — Josh Skroupa
(74) *Attorney, Agent, or Firm* — Knobbe, Martens, Olson & Bear, LLP

(57) ABSTRACT

A ball joint assembly for a vehicle suspension includes a control arm configured to connect to or engage a frame of a vehicle, a ball, a taper connected to the ball, the taper configured to connect to or engage a steering knuckle that connects to a wheel of the vehicle, and/or a housing comprising an adapter system configured to connect to the control arm. The ball at least partially in the housing with grease at least partially between the ball and the housing. The housing, the ball, and the taper are configured for the housing and the ball to articulate relative to each other to provide a predetermined angularity of movement in all 360 degrees of orientation with a predetermined minimum pull-out force in all 360 degrees of orientation.

23 Claims, 8 Drawing Sheets

(58) Field of Classification Search
CPC ..... Y10T 403/32762; Y10T 403/32811; Y10T 403/32852
USPC .................. 403/77, 132, 135, 138, 144, 149
See application file for complete search history.

(56) References Cited

U.S. PATENT DOCUMENTS

| | | | | |
|---|---|---|---|---|
| 5,882,137 A * | 3/1999 | Epp | ................. | B60G 7/005 403/122 |
| 6,010,271 A * | 1/2000 | Jackson | ............ | F16C 11/0628 403/131 |
| 6,042,294 A * | 3/2000 | Urbach | ................. | B60G 3/20 403/135 |
| 7,384,053 B1 * | 6/2008 | Boecker | ............ | B60G 21/0551 280/124.152 |
| 7,452,155 B2 * | 11/2008 | Brunneke | ........... | F16C 11/0647 403/135 |
| 7,600,940 B1 * | 10/2009 | Byrnes | ............... | F16C 11/0623 403/131 |
| 7,661,902 B2 * | 2/2010 | Brunneke | ........... | F16C 11/0628 403/141 |
| 8,047,739 B2 * | 11/2011 | Sellers | ................. | F16C 11/069 403/135 |
| 8,256,980 B2 * | 9/2012 | Walter | ............... | F16C 11/0695 403/135 |
| 8,714,862 B2 * | 5/2014 | Mevorach | ........... | F16C 11/0642 403/125 |
| 9,291,195 B1 * | 3/2016 | Parker | ................ | F16C 11/0628 |
| 9,296,271 B2 * | 3/2016 | Mevorach | ............. | B60G 7/005 |
| 9,446,644 B2 * | 9/2016 | Wilcutt | ............... | B60G 7/005 |
| 9,765,811 B2 * | 9/2017 | Karpman | ............. | B23P 15/003 |
| 10,247,228 B2 * | 4/2019 | Yu | ...................... | F16C 11/0647 |
| 10,294,983 B2 * | 5/2019 | Parker | ................ | F16C 11/0619 |
| 10,350,951 B2 * | 7/2019 | Meyer | ............... | B29C 45/14467 |
| 10,371,195 B2 * | 8/2019 | Parker | ................ | F16C 11/0671 |
| 2005/0111908 A1 * | 5/2005 | Green | ................... | B62D 7/166 403/132 |
| 2011/0142534 A1 * | 6/2011 | Brogardh | ............ | F16C 11/0647 403/141 |

FOREIGN PATENT DOCUMENTS

| | | | | |
|---|---|---|---|---|
| GB | 1181900 A | * | 2/1970 | ............ B60G 7/005 |
| GB | 1186746 A | * | 4/1970 | ............ B60G 7/005 |

* cited by examiner

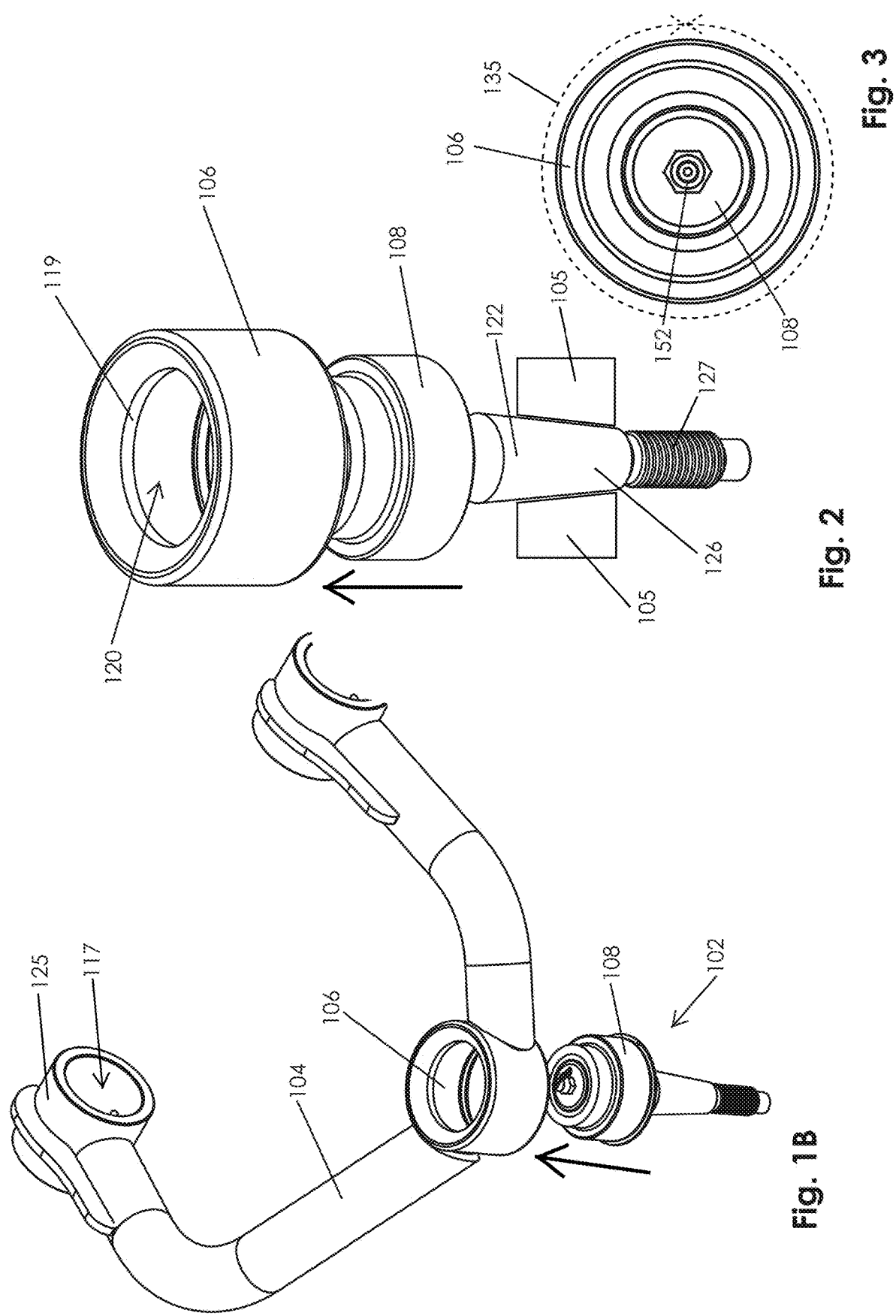

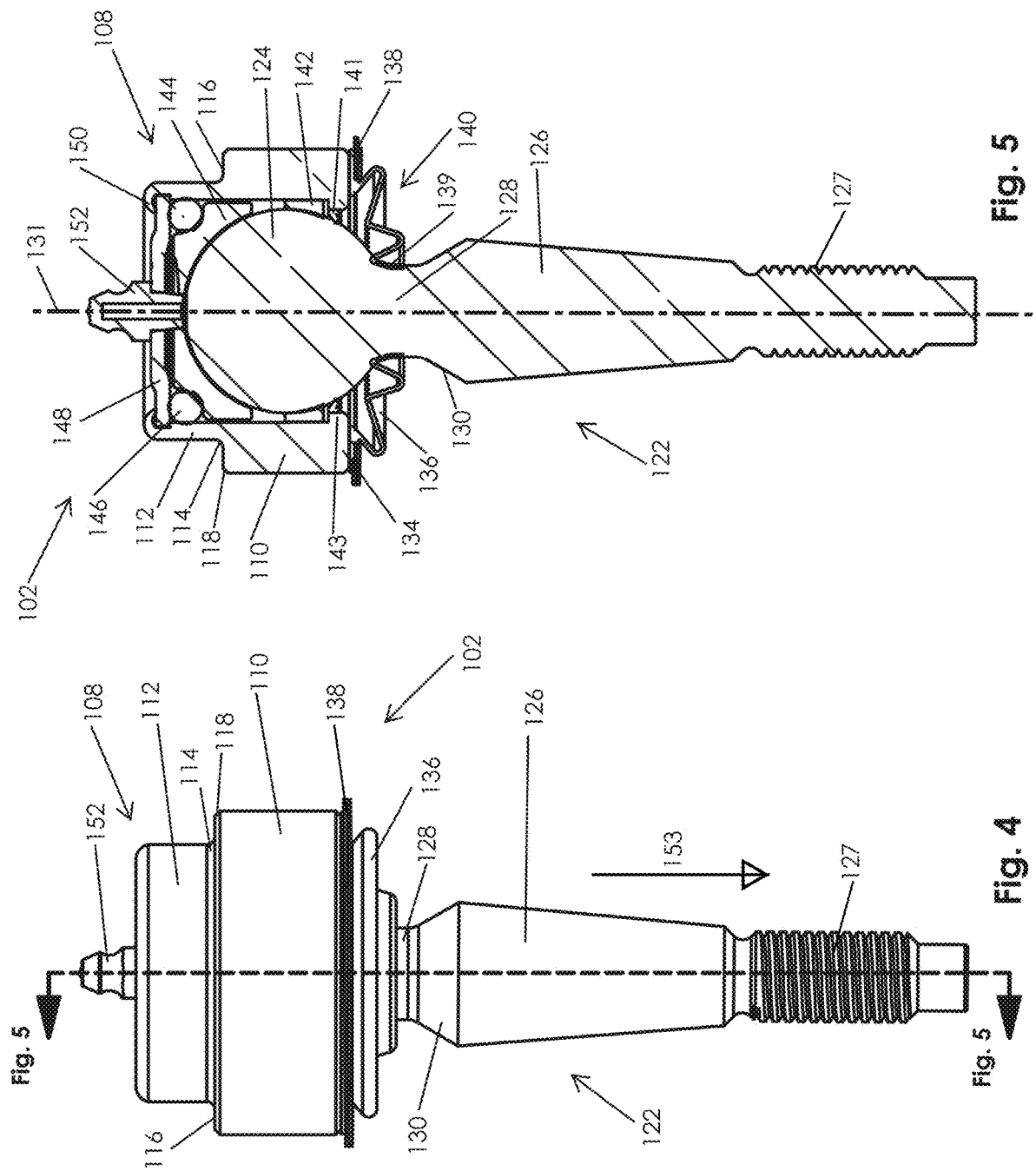

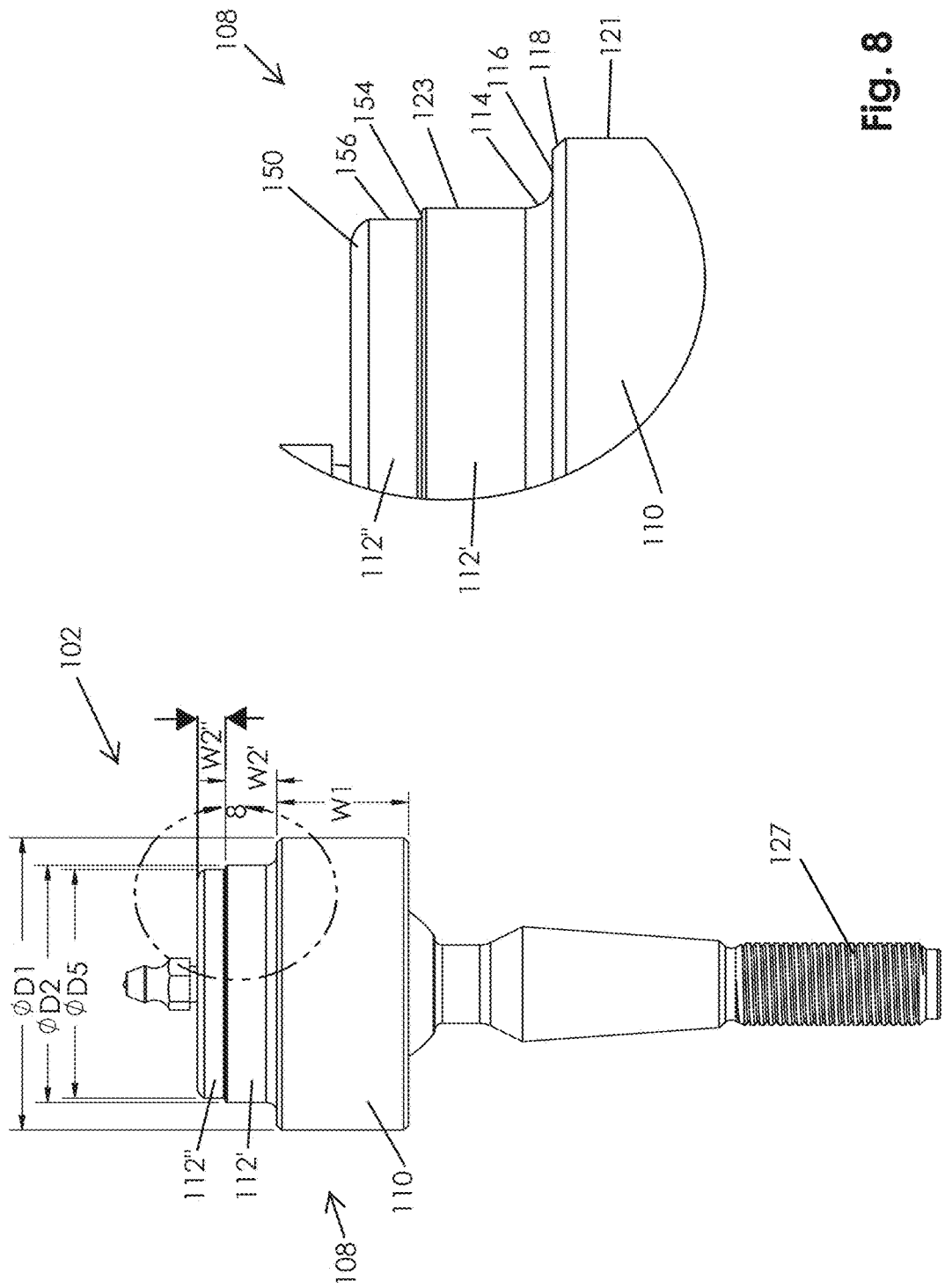

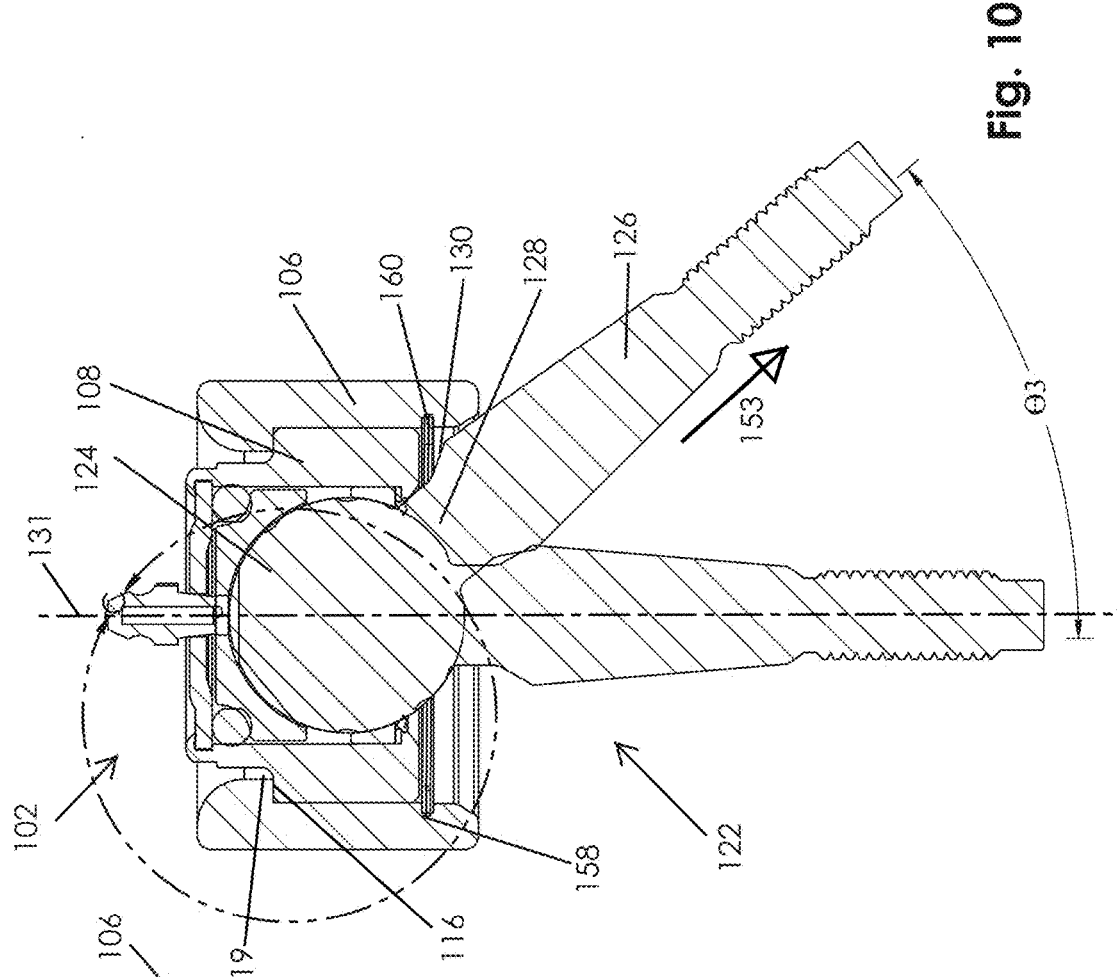
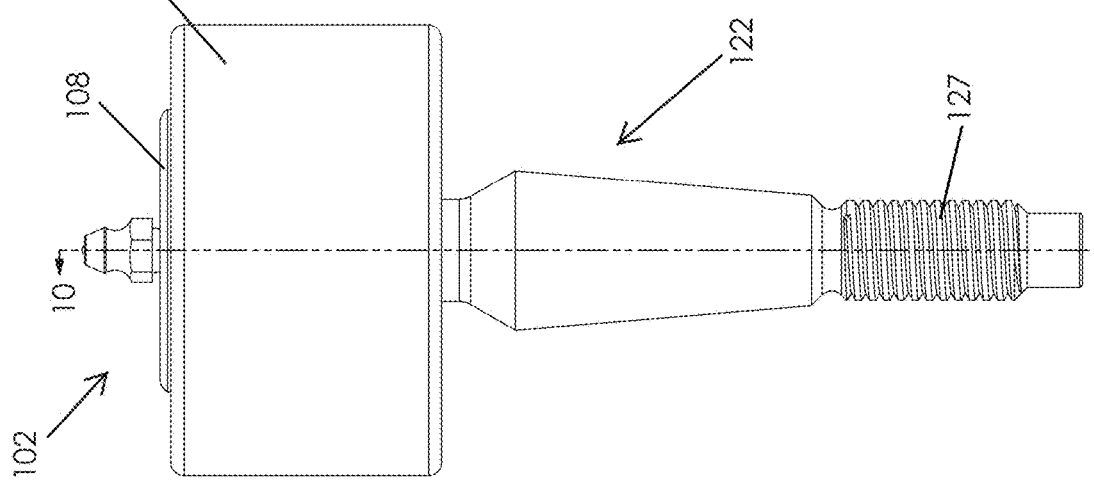
Fig. 10
Fig. 9

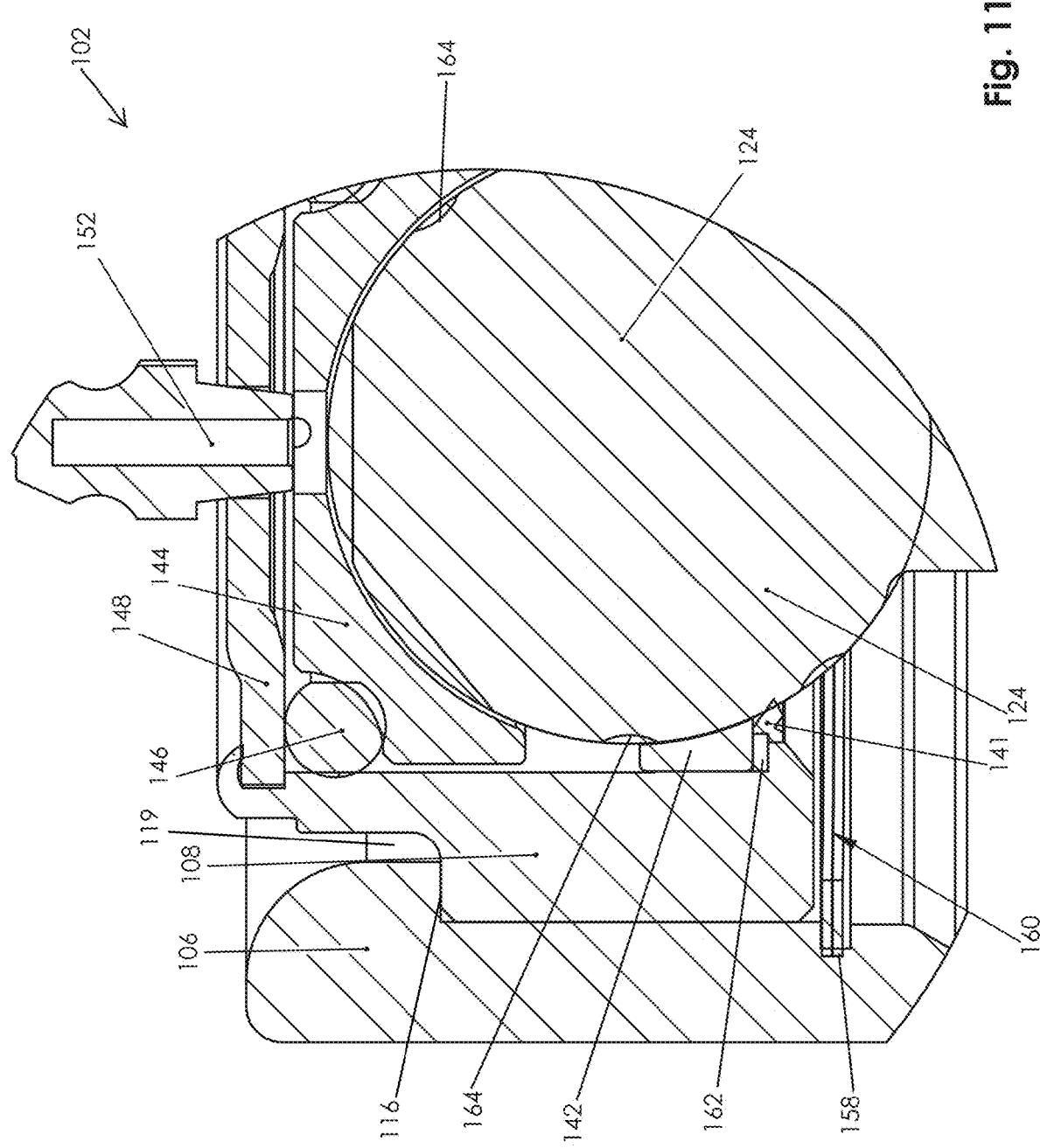

HIGH ANGULARITY BALL JOINT ASSEMBLY

CROSS-REFERENCE TO RELATED APPLICATIONS

This application claims the benefit under 35 U.S.C. § 119(e) as a nonprovisional of U.S. Provisional Application No. 62/411,348, filed Oct. 21, 2016, titled HIGH ANGULARITY RETROFIT SEALED BALL JOINT ASSEMBLY, the entirety of which is incorporated herein by reference and made a part of this specification.

BACKGROUND

Field

The present disclosure generally relates to ball joints, particularly to ball joints for motor vehicle suspension systems.

Description of the Related Art

Motor vehicle suspension systems are designed to damp inputs caused by road surface irregularities, help maintain tire contact with the road, and perform other functions that improve stability of the ride. Control arms and ball joints are some of the key components of a front suspension system. The control arm serves as a link between the chassis and the wheel and manages the motion of the wheels in relation to the chassis. Ball joints are used in front suspension systems to connect the control arm to the steering knuckle in a manner such that the parts can move in more than one direction at the same time.

Vehicles from the factory are usually equipped with stamped control arm affixed to standard ball joints. The ball joints installed with factory control arms do not offer high angularity of movement, such as in all 360 degrees of orientation relative to the vehicle. The factory ball joint can seize up in certain orientations when the limit of the angular displacement is exceeded.

Control arms with tubular design, known as tubular control arms, have been developed by the aftermarket suspension industry for race cars, off road vehicles and the like. An industry standard bearing uniball joint is typically used in tubular control arms. But the uniball joint suffers from drawbacks such as being open to the environment and not providing a greased joint. The uniball joint has, for example, a (polytetrafluoroethylene) PTFE wear piece that is exposed to the environment. The wear piece of the uniball joint has a high rate of wear and tear due to contaminants entering the uniball joint mechanisms from the environment. Therefore, the aftermarket industry standard bearings for tubular control arms suffer from quick wear and low performance, requiring frequent maintenance and replacement to avoid safety issues as well as noise and nuisance issues.

SUMMARY

The present disclosure provides an improved ball joint assembly for motor vehicle suspension systems. The ball joint assembly disclosed herein is designed to allow for greater degree of angular displacement of the steering axis from the vertical axis of a steered wheel of the vehicle and can provide a high or wide angularity of movement at any 360 degrees orientation relative to the vehicle or for example, in at least 90 degrees, and at least 180 degrees of orientation to the vehicle. In some embodiments, the ball joint assembly is configured to be substantially sealed from the environment and yet serviceable by the introduction and maintenance of grease inside the ball joint. In some implementations, the ball joint assembly also includes an adapter system configured to couple to a variety of different control arms to replace commonly used industrial bearings.

Ball joint assemblies of the present disclosure can be retrofitted as an aftermarket part to work with certain control arms, such as aftermarket tubular, formed steel, or billet aluminum control arms, while connecting to and/or at least partially enclosing in the housing a grease fitting, a retainer plate, an O-ring, ball and taper adapter, a grease seal, a dust boot, and/or other components to achieve desired functionality as discussed herein.

In one embodiment, the ball joint assembly generally includes a sealed housing (substantially or generally sealed from the environment); a ball disposed in the housing wherein the housing and the ball are configured to articulate relative to each other to provide a predetermined angularity of movement; a taper connected to the ball; an adapter connected to the housing wherein the adapter is configured to couple the ball joint assembly to a tubular, formed steel, or billet aluminum control arm housing. The ball joint assembly can also include a grease fitting for introducing grease to the sealed housing without allowing debris and other contaminants to enter.

According to this disclosure, A ball joint assembly for a vehicle suspension includes one or more of the following: a control arm configured to connect to or engage a frame of a vehicle; a ball; a taper connected to the ball, the taper configured to connect to or engage a steering knuckle that connects to a wheel of the vehicle; and/or a housing comprising an adapter system configured to connect to the control arm, the ball at least partially in the housing with grease at least partially between the ball and the housing, the housing configured to retain the ball in the housing with a pullout force of at least 10,000 lbs. The adapter system includes one or more of the following: a first portion have a first axial extent and a first outer diameter, the first portion configured to be positioned at least partially in a control arm housing of the control arm; and/or a second portion connected to the first portion, the second portion having a second axial extent less than the first axial extent and a second outer diameter less than the first outer diameter. The housing, the ball, and the taper are configured for the ball to articulate relative the housing in all 360 degrees of orientation. The housing, the ball, and the taper are configured for the housing and the ball to articulate relative to each other to provide a predetermined angularity of movement in all 360 degrees of orientation. The pullout force is at least 10,000 lbs. in all 360 degrees of orientation.

According to this disclosure, the ball joint can further include one or more of the following: an outer surface of the first portion and an outer surface of the second portion circumscribe a central axis of the housing; the adapter system comprises a ledge extending radially between the first and second portions, the ledge configured to rest against a corresponding surface of the control arm; a radial extent of the ledge is 0.2 to 2 inches; the predetermined angularity of movement corresponds to the housing and the ball being capable of articulating relative to each other is at least 40 degrees from a central axis along the housing in all 360 degrees of orientation; and/or the housing is configured to retain the ball in the housing with a pullout force of at least 15,000 lbs.

According to this disclosure, a ball joint assembly for a vehicle suspension includes one or more of the following: a ball; a taper connected to the ball, the taper configured to connect to or engage a steering knuckle of a vehicle suspension; and/or a housing comprising an adapter system configured to connect to or engage a control arm of the vehicle suspension, the ball at least partially in the housing with grease at least partially between the ball and the housing. The adapter system includes one or more of the following: a first portion have a first axial extent and a first outer diameter, the first portion configured to be positioned at least partially in a control arm housing of the control arm; and/or a second portion connected to the first portion, the second portion having a second axial extent less than the first axial extent and a second outer diameter less than the first outer diameter.

According to this disclosure, the ball joint can further include one or more of the following: the first portion comprises an outer wall or surface extending parallel to or along a central axis of the housing; the second portion comprises an outer wall or surface extending parallel or along a central axis of the housing; the outer surfaces of the first and second portions are cylindrical about the central axis; the first outer diameter is 1.5 to 3.5 inches; the second outer diameter is 0.5 to about 2.5 inches; the first axial extent is 0.4 to 2.0 inches; the second axial extent is 0.05 to 1.5 inches; the housing, the ball, and the taper are configured for the housing and the ball to articulate relative to each other to provide a predetermined angularity of movement in all 360 degrees of orientation; and/or the predetermined angularity of movement corresponds to the housing and the ball being capable of articulating relative to each other at least about 35 degrees from a central axis along the housing in all 360 degrees of orientation.

According to this disclosure, a ball joint assembly for a vehicle suspension includes one or more of the following: a ball; a taper connected to the ball, the taper configured to connect to or engage a steering knuckle of a vehicle suspension; and/or a housing configured to connect to or engage a control arm of the vehicle suspension, the ball at least partially in the housing and at least partially sealed by a grease seal, the housing configured to retain the ball in the housing with a pullout force of at least 6,800 lbs. The housing, the ball, and the taper are configured for the ball to articulate relative the housing in at least 180 degrees of orientation. The housing, the ball, and the taper are configured for the housing and the ball to articulate relative to each other to provide a predetermined angularity of movement in the at least 180 degrees of orientation. The pullout force is at least 6,800 lbs. in the at least 180 degrees of orientation.

According to this disclosure, the ball joint can further include one or more of the following: the predetermined angularity of movement corresponds to the housing and the ball being capable of articulating relative to each other at least 30 degrees from a central axis along the housing in the at least 180 degrees of orientation; the pullout force is at least 20,000 lbs. in the at least 180 degrees of orientation; a neck connecting the ball to the taper, the neck having a predetermined length to provide clearance for the housing and the ball articulate relative to each other; the predetermined length of the neck is 0.1 to 2.2 inches; and/or the neck comprises a diameter of 0.4 to 0.8 inches.

According to this disclosure, a ball joint assembly for a motor vehicle suspension includes one or more of the following: a ball; a taper connected to the ball, the taper configured to connect to or engage a steering knuckle of a motor vehicle suspension; and/or a housing configured to connect to or engage a control arm of the motor vehicle suspension, the ball at least partially in the housing with grease at least partially between the ball and the housing, the housing configured to retain the ball in the housing with a pullout force of at least 10,000 lbs. The housing, the ball, and the taper are configured for the ball to articulate relative the housing in all 360 degrees of orientation. The housing, the ball, and the taper are configured for the housing and the ball to articulate relative to each other to provide a predetermined angularity of movement in all 360 degrees of orientation. The pullout force is at least 10,000 lbs. in all 360 degrees of orientation.

According to this disclosure, a ball joint assembly for a motor vehicle suspension includes one or more of the following: a ball; a taper connected to the ball, the taper configured to connect to or engage a steering knuckle of a motor vehicle suspension; and/or a housing comprising an adapter system configured to connect to or engage a control arm of the motor vehicle suspension, the ball at least partially in the housing with grease at least partially between the ball and the housing. The housing can retain the ball in the housing with a pullout force of at least 10,000 lbs. The adapter system can have an outer diameter of less than 2.75 inches.

According to this disclosure, a ball joint assembly for a motor vehicle suspension includes one or more of the following: a ball; a taper connected to the ball, the taper configured to connect to or engage a steering knuckle of a motor vehicle suspension; and/or a housing comprising an adapter system configured to connect to or engage a control arm of the motor vehicle suspension, the ball at least partially in the housing with grease at least partially between the ball and the housing. The housing, the ball, and the taper are configured for the ball to articulate relative the housing in all 360 degrees of orientation. The adapter system can have an outer diameter of less than 2.75 inches.

According to this disclosure, the ball joint can further include one or more of the following: the predetermined angularity of movement corresponds to the housing and the ball being capable of articulating relative to each other at least 60 degrees from a central axis along the housing in all 360 degrees of orientation; the predetermined angularity of movement corresponds to the housing and the ball being capable of articulating relative to each other at least 35 degrees from a central axis along the housing in all 360 degrees of orientation; a neck connecting the ball to the taper, the neck having a predetermined length to provide clearance for the housing and the ball articulate relative to each other; the predetermined length of the neck is 0.1 to 2.2 inches; the predetermined length of the neck is 0.5 to 1.7 inches; the neck comprises a diameter of 0.4 to 0.8 inches; the neck comprises a diameter of 0.5 to 0.7 inches; a shoulder connecting the neck to the taper, the shoulder extending from a central axis along the taper at a predetermined angle to provide clearance for the housing and the ball articulate relative to each other; the predetermined angle of the shoulder is 10 to 60 degrees; the predetermined angle of the shoulder is 15 to 45 degrees; the housing comprises a first portion and a second portion, the second portion having a smaller diameter than the first portion to form a ledge extending radially between the first and second portions, the ledge configured to rest against a corresponding surface of the control arm; the ledge is substantially perpendicular to the central axis; the first portion has an outer diameter of 1.5 to 3.5 inches; the first portion has an outer diameter of 1.7 to 3.3 inches; the first portion has an outer diameter of 2 to 2.75 inches; the second portion has an outer diameter of 0.5 to about 2.5 inches; the second portion has an outer diameter of 0.8 to 2 inches; the second portion has an outer diameter of 1.625 inches; the first portion has an axial extent of 0.4 to 2.0 inches; the first portion has an axial extent of 0.8 to 1.7 inches; the first portion has an axial extent of 0.775 to 1.094 inches; the second portion has an axial extent of 0.05 to 1.5 inches; the second portion has an axial extent of 0.1 to 1 inches; the second portion has an axial extent of 0.3 inches; the first and second portions have an inner diameter of 0.4 to 2.4 inches; the first and second portions have an inner diameter of 0.7 to 1.9 inches; the first portion has a radial thickness of 0.3125 to 1.417 inches; the second portion has a radial thickness of 0.1 to 1 inches; and/or a radial extent of the ledge is 0.2 to 2 inches; a radial extent of the ledge is 0.375 to 1.125 inches.

According to this disclosure, the ball joint can further include one or more of the following: a dust boot positioned between the ball and the housing; the dust boot configured to inhibit contaminants from entering an interior of the housing; a first race positioned between the ball and the housing, the first race configured to retain the ball in a desired positioned relative to the housing; a second race positioned between the ball and the housing, the second race configured to retain the ball in a desired position relative to the housing; a cap plate retained by the housing, the cap plate inhibiting movement of the ball out of the housing; a gasket positioned against the cap plate, the gasket configured to at least partially seal an interior of the housing; a grease fitting extending through the cap plate, the grease fitting configured to convey grease into the an interior of the housing; the pullout force is at least 20,000 lbs; and/or the pullout force is at least 30,000 lbs.

According to this disclosure, a ball joint assembly for a vehicle suspension includes one or more of the following: a ball; a taper connected to the ball, the taper configured to connect to or engage a steering knuckle of a motor vehicle suspension; and/or a housing comprising an adapter system configured to connect to or engage a control arm of the motor vehicle suspension, the ball at least partially in the housing with grease at least partially between the ball and the housing. The adapter system includes one or more of the following: a first portion have a first axial extent and a first outer diameter, the first portion configured to be positioned at least partially in a control arm housing of the control arm; and/or a second portion connected to the first portion, the second portion having a second axial extent less than the first axial extent and a second outer diameter less than the first outer diameter.

According to this disclosure, the ball joint can further include one or more of the following: the first portion comprises an outer wall or surface extending parallel or along a central axis of the housing; the outer surface of the first portion circumscribes the central axis of the housing; the outer surface of the first portion is cylindrical about the central axis; the second portion comprises an outer wall or surface extending parallel or along a central axis of the housing; the outer surface of the second portion circumscribes the central axis of the housing; and/or the outer surface of the second portion is cylindrical about the central axis.

According to this disclosure, the ball joint can further include one or more of the following: a neck connecting the ball to the taper, the neck having a predetermined length to provide clearance for the housing and the ball articulate relative to each other; the predetermined length of the neck is 0.1 to 2.2 inches; the predetermined length of the neck is 0.5 to 1.7 inches; the neck has a diameter of 0.4 to 0.8 inches; the neck has a diameter of 0.5 to about 0.7 inches; the neck has a diameter of 0.565 inches; a shoulder connecting the neck to the taper, the shoulder extending from a central axis along the taper at a predetermined angle to provide clearance for the housing and the ball articulate relative to each other; the predetermined angle of the shoulder is 10 to 60 degrees; the predetermined angle of the shoulder is 15 to 45 degrees; The adapter system comprises a ledge extending radially between the first and second portions, the ledge configured to rest against a corresponding surface of the control arm; a radial extent of the ledge is 0.2 to 2 inches; a radial extent of the ledge is 0.375 to 1.125 inches; the first outer diameter is 1.5 to 3.5 inches; the first outer diameter is 1.7 to 3.3 inches; the first outer diameter is 2 to 2.75 inches; the second outer diameter is 0.5 to about 2.5 inches; the second outer diameter is 0.8 to 2 inches; the second outer diameter is 1.625 inches; the first axial extent is 0.4 to 2.0 inches; the first axial extent is 0.8 to 1.7 inches; the first axial extent is 0.775 to 1.094 inches; the second axial extent is 0.05 to 1.5 inches; the second axial extent is 0.1 to 1 inches; the second axial extent is 0.3 inches; the first and second portions have an inner diameter of 0.4 to 2.4 inches; the first and second portions have an inner diameter of 0.7 to 1.9 inches; the first portion has a radial thickness of 0.3125 to 1.417 inches; and/or the second portion has a radial thickness of 0.1 to 1 inches.

According to this disclosure, the ball joint can further include one or more of the following: a dust boot positioned between the ball and the housing, the dust boot configured to inhibit contaminants from entering an interior of the housing; a first race positioned between the ball and the housing, the first race configured to retain the ball in a desired positioned relative to the housing; a second race positioned between the ball and the housing, the second race configured to retain the ball in a desired position relative to the housing; a cap plate retained by the housing, the cap plate inhibiting movement of the ball out of the housing; a gasket positioned against the cap plate, the gasket configured to at least partially seal an interior of the housing; a grease fitting extending through the cap plate, the grease fitting configured to convey grease into the an interior of the housing; the housing is configured to retain the ball in the housing with a pullout force of at least 10,000 lbs; the housing is configured to retain the ball in the housing with a pullout force of at least 20,000 lbs; the housing is configured to retain the ball in the housing with a pullout force of at least 30,000 lbs.; the housing, the ball, and the taper are configured for the ball to articulate relative the housing in all 360 degrees of orientation; the housing, the ball, and the taper are configured for the housing and the ball to articulate relative to each other to provide a predetermined angularity of movement in all 360 degrees of orientation; the predetermined angularity of movement corresponds to the housing and the ball being capable of articulating relative to each other at least 60 degrees from a central axis along the housing in all 360 degrees of orientation; and/or the predetermined angularity of movement corresponds to the housing and the ball being capable of articulating relative to each other at least 35 degrees from a central axis along the housing in all 360 degrees of orientation.

A method of using the foregoing ball joint assembly/assemblies is included; the method of use can include using or assembling any one or more of the foregoing features to achieve functions and/or features of the assembly as discussed in this disclosure. A method of manufacturing the foregoing assembly is included; the method of manufacture can include providing, making, connecting, assembling, and/or installing any one or more of the foregoing features or components of the assembly to achieve functions and/or features of the system as discussed in this disclosure.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 1B illustrates a side top perspective view of embodiments of a ball joint, a control arm, and a control arm housing.

FIG. 2 illustrates a side top perspective view of embodiments of a ball joint and a control arm housing.

FIG. 3 illustrates a top view of embodiments of a ball joint and a control arm housing.

FIG. 4 illustrates a side view of an embodiment of a ball joint.

FIG. 5 illustrates a side cross-sectional view of an embodiment of a ball joint.

FIG. 7 illustrates a side view of an embodiment of a ball joint assembly.

FIG. 8 illustrates an enlarged side view of an embodiment of the ball joint housing.

FIG. 9 illustrates a side view of embodiments of a ball joint and a control arm housing.

FIG. 10 illustrates a cross-sectional view of embodiments of the ball joint and the control arm housing.

FIG. 11 illustrates an enlarged side cross-sectional view of an embodiment of the ball joint and the control arm housing.

DETAILED DESCRIPTION

Figure 1A:
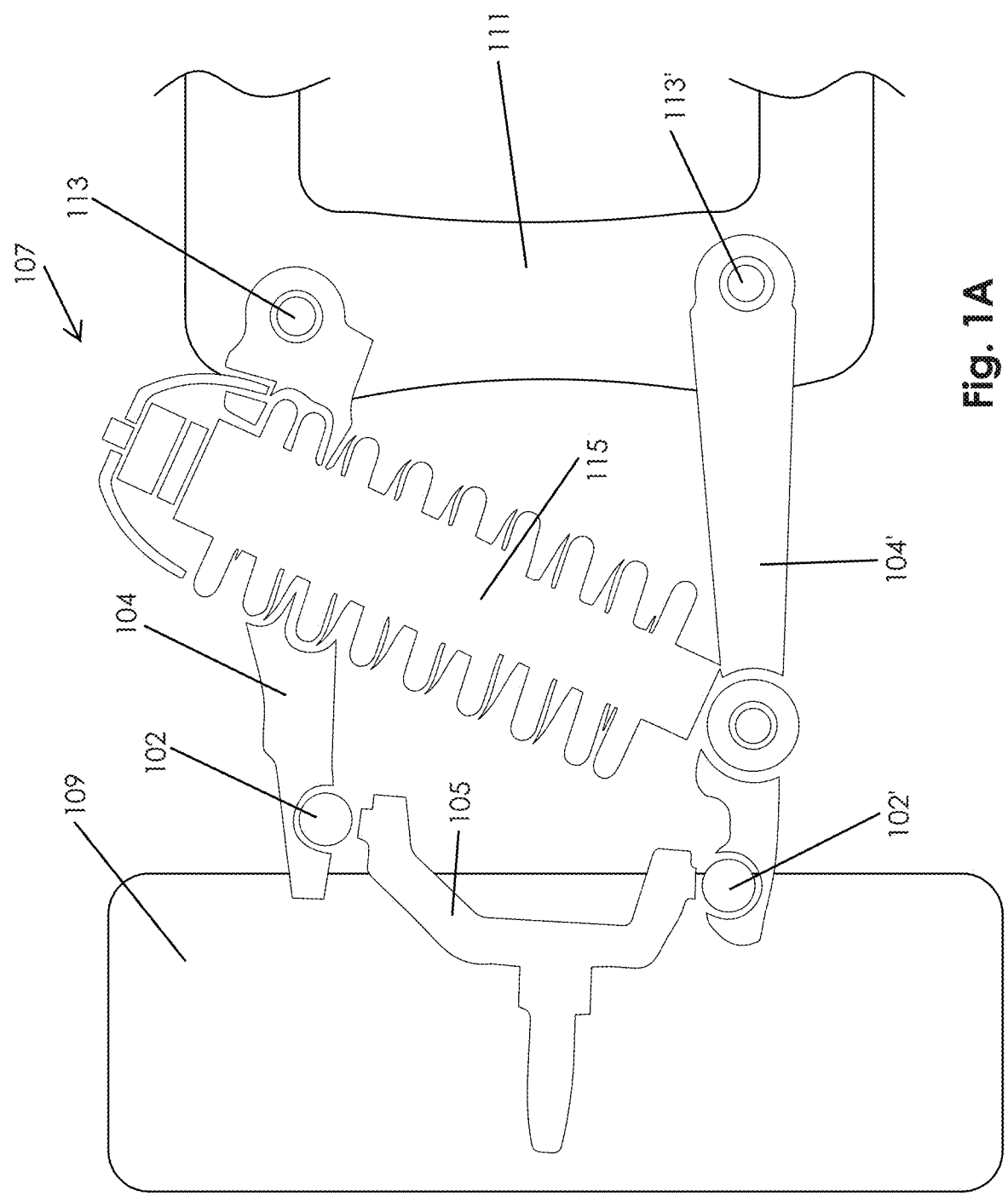
FIG. 1A illustrates a schematic view of embodiments of ball joints connected to control arms and a steering knuckle of a vehicle suspension.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

In particular, embodiments disclosed herein pertain to ball joints, which allow ease of maintenance and longevity of the components while providing high or wide angle/angularity of movement of the ball joint. Ball joints disclosed herein can be used with motor vehicles.

Motor vehicles can have an independent suspension that allows each wheel to articulate independent of each other. One with ordinary skill will realize that the ball joint as discussed herein can be adjusted to work with different suspension types and designs.

FIG. 1A illustrates a schematic view of embodiments of ball joints 102, 102' connected to control arms 104, 104' and a steering knuckle 105 of a vehicle suspension 107 of a vehicle. The steering knuckle 105 can be connected to a wheel 109 of the vehicle. The control arms 104, 104' can be connected to a frame or chassis 111 of the vehicle via bushings 113, 113'. The vehicle or vehicle suspension 107 can have an upper or first control arm 104 and a lower or second control arm 104'. The upper control arm 104 can be connected to an upper or first ball joint 102. The lower control arm 104' can be connected to a lower or second ball joint 102'. One or both ball joints 102, 102' can be connected to the steering knuckle 105 that is connected to the wheel 109. The lower ball joint 102' can be different or the same as the upper ball joint 102. As illustrated in FIG. 1A, a shock 115 of the vehicle (e.g., vehicle suspension) can be connected to the lower control arm 104' to at least partially provide shock absorption and dampening of the vehicle suspension 107.

FIG. 1B illustrates a side top perspective view of embodiments of a ball joint 102 (e.g., upper or first ball joint), a control arm 104, and a control arm housing 106 (e.g., weld-in bearing cup). FIG. 1B illustrates a ball joint or ball joint assembly 102 that can be used with a control arm 104 (e.g., a tubular, formed steel, or billet aluminum control arm as well as cast steel control arms) having a control arm housing 106. FIG. 1B illustrates a tubular control arm, but the control arm may be any suitable control arm such as formed steel or billet aluminum control arms. FIG. 2 illustrates a side top perspective view of embodiments of the ball joint 102 and the control arm housing 106. FIG. 3 illustrates a top view of embodiments of the ball joint 102 and the control arm housing 106. FIG. 3 illustrates the ball joint 102 positioned in the control arm housing 106. The ball joint 102 can have a ball joint housing 108 sized and shaped to connect, mate, engage, and/or be positioned in the control arm housing 106. The ball joint housing 108 can be positioned into and pressed into the control arm housing 106. The control arm 104 and the associated control arm housing 106 can be standard aftermarket control arm assemblies used in the industry, such as a tubular control arm. For example, the control arms 104 and control arm housing 106 can be used with an industrial bearing such as a uniball joint. The control arm 104 can have bushing openings 117 formed by bushing housings 125 designed to connect, mate, and/or engage with control arm bushings 113 to connect to the chassis 111 of the vehicle.

FIG. 2 schematically illustrates a steering knuckle 105 that can connects to the wheel 109 of the vehicle. The steering knuckle 105 can connect, engage, and/or mate with the ball joint 102, for example, about the taper 126. The ball joint 102 or taper 126 can have threads 127 that can engage a nut to secure and retain the steering knuckle on the ball joint 102. Any other suitable mechanism can be used to secure the ball joint 102 and the steering knuckle 105.

Figure 6:
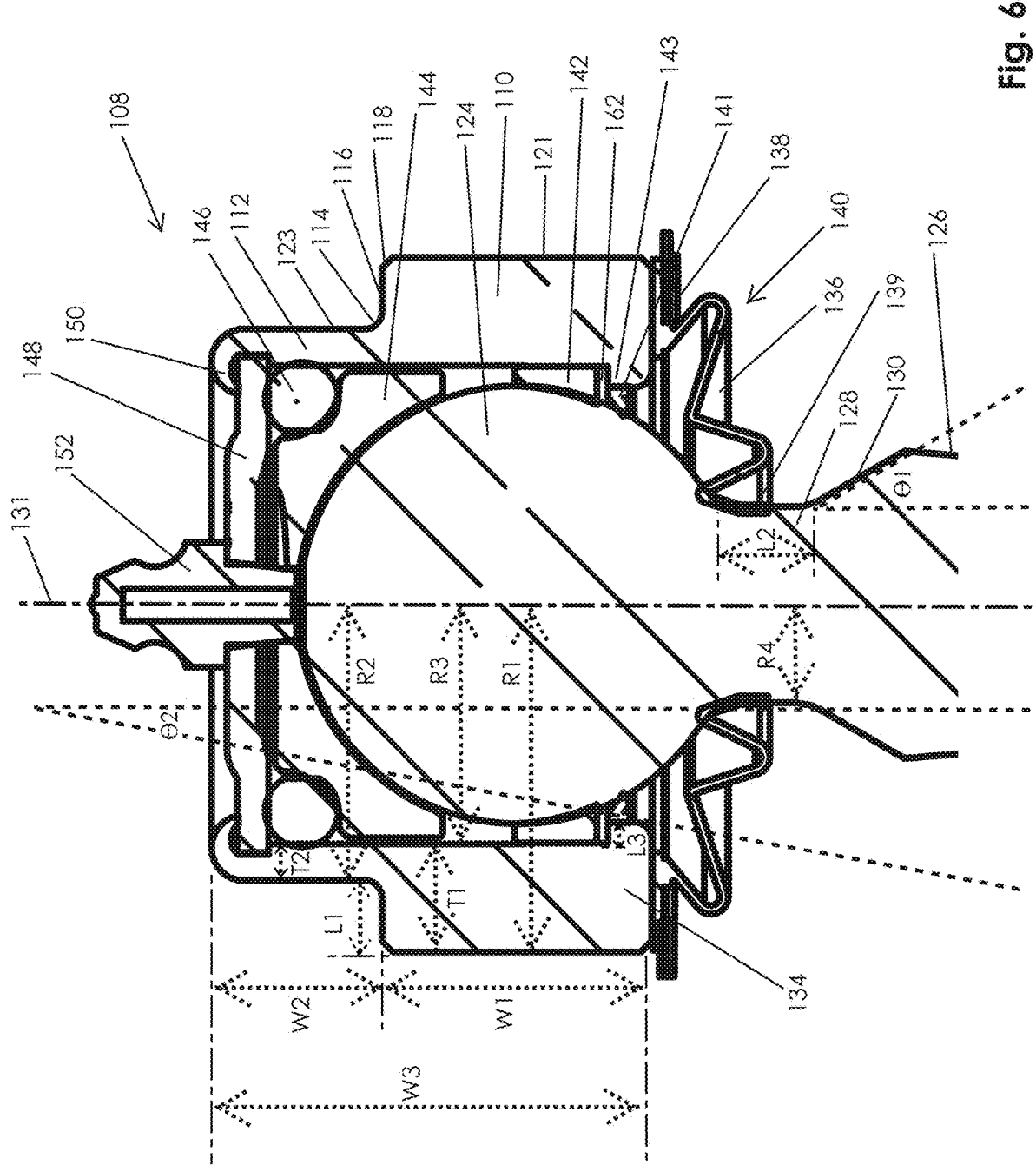
FIG. 6 illustrates an enlarged side cross-sectional view of an embodiment of a ball joint.
Figure 12D:
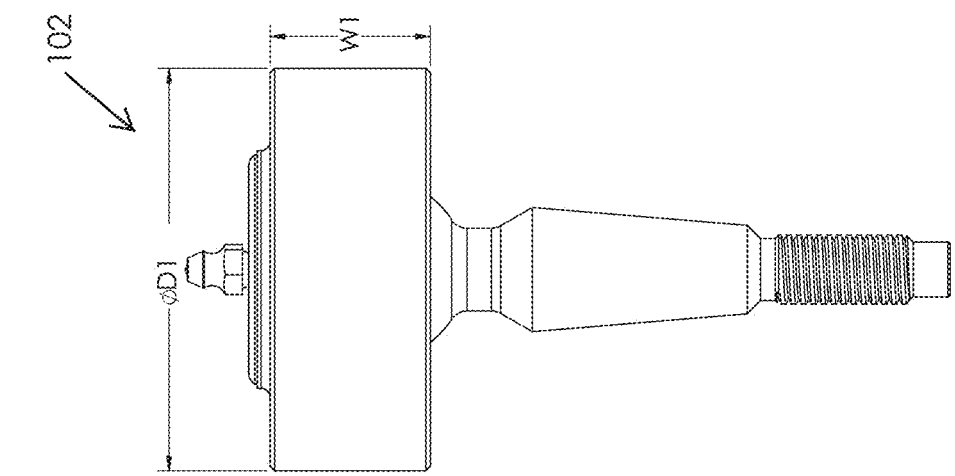
FIGS. 12A-D illustrate side views of embodiments of various ball joint assemblies.
Figure 12C:
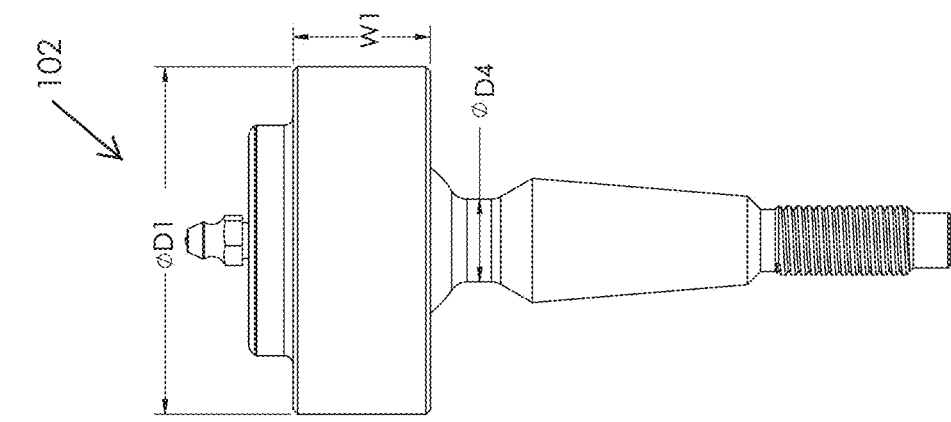
Figure 12B:
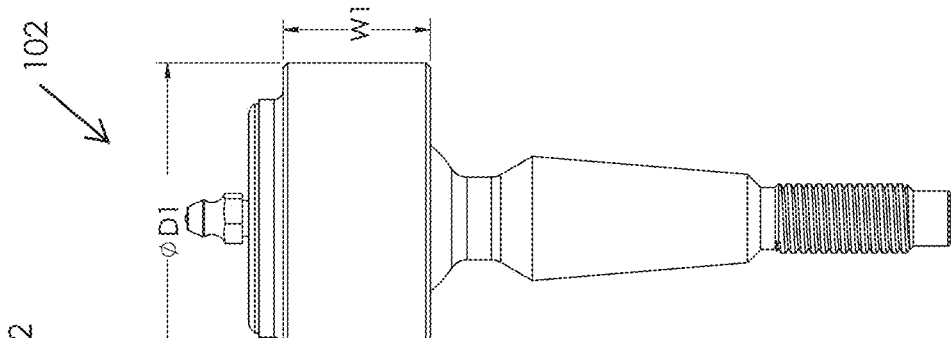
Figure 12A:
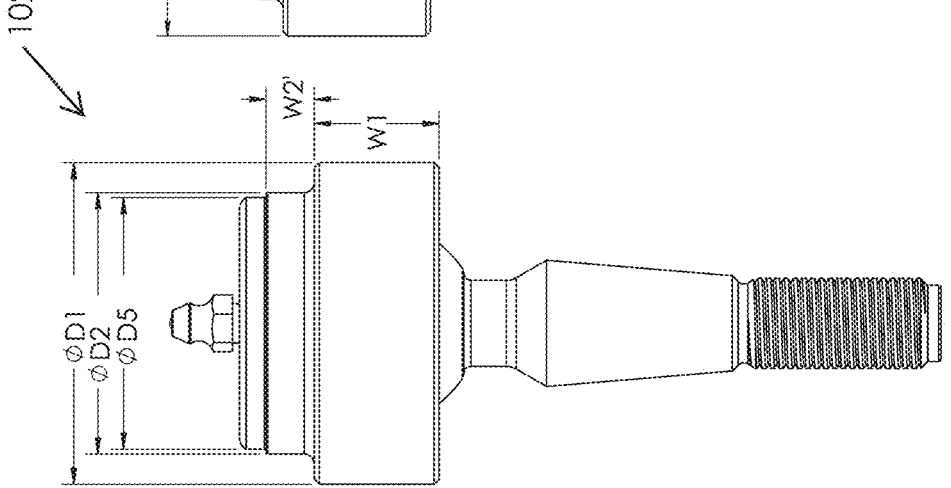

FIG. 4 illustrates a side view of an embodiment of a ball joint 102. FIG. 5 illustrates a side cross-sectional view of an embodiment of a ball joint 102. FIG. 6 illustrates an enlarged side cross-sectional view of an embodiment of a ball joint 102. The ball joint housing 108 can have two portions. The ball joint housing 108 can have a lower or first portion 110 and an upper or second portion 112. The upper portion 112 can have a smaller outer diameter relative to an outer diameter of the lower portion 110.

The lower portion 110 and the upper portion 112 can be connected by a chamfer, edge, corner, fillet, and/or bevel 114. The chamfer 114 can create a smooth and/or gradual transition between the lower portion 110 and the upper portion 112 to allow for desired engagement with the control arm housing 106 while minimizing undesired pressure points and/or sharp corners. As illustrated, the lower portion 110 and the upper portion 112 can form a ledge, step, and/or rest 116.

As also illustrated, the lower portion 110 can have a chamfer, edge, corner, fillet, and/or bevel 118. The chamfer 118 can create a smooth and/or gradual transition between the ledge 116 and outer surface of the lower portion 110 to allow for desired engagement with the control arm housing 106 while minimizing undesired pressure points and/or sharp corners. Accordingly, the lower portion 110 and the upper portion 112 of the ball joint housing 108 can form a shape (e.g. stacked or tiered pyramidal shape) that securely engages the control arm housing 106 in a desired position as discussed herein.

As discussed herein, the control arm housing 106 can be positioned about the ball joint housing 108. A portion of the control arm housing 106 can be positioned about or circumscribe the lower portion 110. A flange and/or lip 119 of the control arm housing 106 can extend inwardly such that the flange 119 is proximate to and/or rests on the ledge 116 when the control arm housing 106 is positioned on the ball joint housing 108. In some embodiments, the control arm housing 106 can have a corresponding internally projecting ledge (e.g., a surface of flanges 119) that is proximate to and/or rests on the ledge 116 when the control arm housing 106 is positioned on the ball joint housing 108. In some embodiments, the upper portion 112 of the control arm housing 106 can extend through an opening 120 formed in the control arm housing 106 by the flanges 119. Accordingly, the control arm housing 106 can have an inner surface that fits against, rests against, frictionally engages, and/or press fits against an outer surface 121 of the lower portion 110. Further, the control arm housing 106 can have another inner surface that fits against, rests against, frictionally engages, and/or is relatively proximate to an outer surface 123 of the upper portion 112. The inner surface of the control arm housing 106 that is proximate to the outer surface 123 of the upper portion 112 can correspond to an inner surface part of or forming the opening 120. Such engagement as well as other suitable mating mechanisms (e.g., retainer ring 160 as discussed herein) can facilitate securing the ball joint 102 to the control arm housing 106.

The lower portion 110 can have an outer diameter D1 (or two times radius R1) ranging from about 1.5 to about 3.5 inches, about 1.7 to about 3.3 inches, about 2 to about 3 inches, about 2 to about 2.75 inches, and 2.000, 2.125, and 2.917 inches, including the foregoing values and ranges bordering therein. For example, R1 can be about 1, about 1.0625, about 1.1875, or about 1.375 inches. The upper portion 112 can have an outer diameter D2 (or two times radius R2) ranging from about 0.5 to about 2.5 inches, about 0.8 to about 2 inches, and about 1.0 to about 1.625 inches, including the foregoing values and ranges bordering therein. The ledge 116 can have a length or radial length or extent L1 that is generally half the difference between D1 and D2. For example, the radial length L1 can range from about 1 to about 3 inches, about 1.5 to about 2.5 inches, about 0.1 to about 3 inches, about 0.2 to about 2 inches, about 0.375 to about 1.125 inches, including about 0.375 inches, about 0.5 inches, about 0.75, and about 1.125 inches, including the foregoing values and ranges bordering therein.

The ball joint housing 108 can have an inner diameter D3 (or two times R3) ranging from about 0.4 to about 2.4 inches, about 0.7 to about 1.9 inches, about 0.9 to about 1.4 inches, about 1 inch, about 1.375, and about 1.425 inches including the foregoing values and ranges bordering therein. For example, R3 can be about 0.250 to about 0.375 inches. The lower portion 110 can have a thickness T1 (e.g., radial thickness) ranging from about 0.2 to about 3.9 inches, about 0.5 to about 3.5 inches, about 1 to about 3 inches, and about 0.3125, about 0.375, about 0.5, about 0.6625, about 1.125, and about 1.417 inches, including about 0.3125 to about 1.417 inches, including the foregoing ranges and ranges bordering therein. The upper portion 112 can have a thickness T2 (e.g., radial thickness) ranging from about 0.1 to about 2.1 inches, about 0.5 to about 1.8 inches, about 1 to about 1.5 inches, about 0.05 to about 1 inches, about 0.1 to about 1 inches, and about 0.125 inches, including the foregoing values and ranges bordering therein.

The lower portion 110 can have an axial extent width W1 ranging from about 0.4 to about 2.0 inches, about 0.8 to about 1.7 inches, about 1.0 to about 1.5 inches, and about 0.775, about 0.791, about 1.000, about 1.005, about 0.937, about 1.094, and about 1.500 inches, including the foregoing values and ranges bordering therein. The upper portion 112 can have an axial extent width W2 ranging from about 0.05 to about 1.5 inches, about 0.1 to about 1.0 inches, and about 0.150 to about 0.400 inches, including about 0.300 inches, including the foregoing values and ranges bordering therein. Accordingly, the total axial extent or total width W3 of the ball joint housing 108 can range from about 1 to about 4.0 inches, about 1 to about 2 inches, about 1.255 to about 2 inches, about 1.5 to about 3.5 inches, about 2 to about 3 inches, and about 1.255 inches, including the foregoing values and ranges bordering therein.

As illustrated, the ball joint 102 can have a ball and taper 122. The ball and taper 122 can have a ball or ball portion 124 (e.g., ball stud taper adapter). The ball and taper 122 can have a taper, taper portion, or shaft 126. The ball 124 and the taper 126 can be connected by a neck 128. The neck 128 can have a diameter D4 (or two times radius R4) ranging from about 0.3 to about 2.3 inches, about 0.6 to about 1.8 inches, about 0.8 to about 1.3 inches, about 0.4 to about 0.8 inches, about 0.5 to about 0.875 inches, about 0.5 to about 0.7 inches, including about 0.565 inches, including the foregoing values and the ranges bordering therein. For example, R4 can be about 0.15 to about 1.25 inches, about 0.25 to about 0.5 inches, about 0.2 to about 0.4 inches, about 0.25 to about 0.35 inches, including about 0.2825 inches, including the foregoing values and ranges bordering therein. For example, diameter D4 can be about 0.500 to about 0.875, including about 0.565 inches, including the foregoing values and ranges bordering therein. Diameter D4 and radius R4 can be substantially uniform or same about a central axis 131 to allow for the high angularity of movement as discussed herein in substantially any orientation of the ball joint housing 108 (for example, any 360 degree rotation position relative to the central axis 131, which can correspond to an orientation relative to the vehicle). The neck 128 can have a length L2 ranging from about 0.1 to about 2.2 inches, about 0.5 to about 1.7 inches, about 0.7 to about 1.2 inches, and about 0.250 to about 0.450 inches, including the foregoing values and the ranges bordering therein. The ball and taper 122, and in particular the taper 126 can vary based on make, model, and year of the vehicle the ball joint 102 is used with.

The ball and taper 122 can have a shoulder 130. The shoulder 130 can connect the body of the taper 126 to the neck 128. The shoulder 130 can be tapered to extend from the relatively wider taper 126 to the neck 128. The shoulder 130 can taper at an angle θ1 relative to a central or longitudinal axis 131. A longitudinal axis can extend along a relatively longest dimension of a component. The angle θ1 can vary from about 10° to about 60°, about 15° to about 45°, about 30° to about 50°, and about 45°, including the foregoing values and ranges bordering therein. Angle θ1 can be substantially uniform or same about the central axis 131 to allow for the high angularity of movement as discussed herein in substantially any orientation of the ball joint housing 108 (for example, any 360 degree rotation position relative to the central axis 131, which can correspond to an orientation relative to the vehicle).

The neck 128, including its diameter D3 and length L2, and the shoulder 130, including the angle Θ1, can be varied to achieve desired or predetermined angularity range of the ball joint 102. As illustrated in FIGS. 5 and 6 for example, a bottom portion 134 of the ball joint housing 108 can have clearance to allow the ball joint housing 108 to pivot about the ball 124 in substantially any orientation. For example, as the ball joint housing 108 pivots about the ball 124, a part of the bottom portion 134 is not obstructed from moving toward the neck 128 and/or shoulder 130 (as another part of the bottom portion 134 moves away from the neck 128 and/or shoulder 130) in substantially any orientation.

The diameter D3 and length L2 of the neck 128 allows for a predetermined range of movement of the bottom portion 134 (and correspondingly the ball joint housing 108) before coming into contact or becoming proximate to the neck 128. Similarly, the angle Θ1 of the shoulders 130 allows for a predetermined range of movement of the bottom portion 134 (and correspondingly the ball joint housing 108) before coming into contact or becoming proximate to the neck 128.

As illustrated in FIG. 6, the ball joint housing 108 can have a predetermined range of movement associated with an angle θ2 relative to the central axis 131. The angle θ2 corresponds to a predetermined range of angularity for movement of the ball joint 102 (e.g., movement of the ball and taper 122 relative to the ball joint housing 108). The angle θ2 can vary from about 15° to about 60°, about 17.5° to about 50°, about 30° to about 45°, including the foregoing values and ranges bordering therein, and can be up to about 35°, up to about 40°, up to about 45°, up to about 50°, and up to about 60°, including the foregoing values and ranges bordering therein, in substantially any orientation or range of movement of the ball and taper 122 relative to the ball joint housing 108. The angle θ2 as illustrated in FIG. 6 can be about 35°, about 40°, about 45°, about 50°, and about 60°, including the foregoing values and ranges bordering therein, in substantially any orientation or range of movement of the ball and taper 122 relative to the ball joint housing 108. The angle θ2 as illustrated in FIG. 6 can be at least about 35°, at least about 40°, at least about 45°, at least about 50°, and at least about 60°, including the foregoing values and ranges bordering therein, in substantially any orientation or range of movement of the ball and taper 122 relative to the ball joint housing 108. Angle θ2 can be substantially uniform or same about the central axis 131 to allow for the high angularity of movement as discussed herein in substantially any orientation of the ball joint housing 108 (for example, any 360 degree rotation position relative to the central axis 131, which can correspond to an orientation relative to the vehicle). FIG. 3 illustrates, for example, any 360 degree rotation position with dashed line 133 about the control arm housing 106 and/or ball joint housing 108 (including about the central axis 131 as discussed herein). In some embodiments, angle θ2 can be substantially uniform or same about the central axis 131 to allow for the high angularity of movement as discussed herein in substantially in at least about 90 degrees, at least about 180 degrees, or all about 360 degrees, including about 90 to about 180 degrees, including about 120 to about 210, including about 150 to about 240, and including about 180 to about 360, including the foregoing values and ranges bordering therein, of rotation or position relative to the central axis 131, which can correspond to an orientation relative to the vehicle. The the central axis 131 as discussed herein can be considered a central axis of the ball joint housing 108 with the ball 124 and/or taper 126 (for example, ball and taper 122) pivoting or moving the articulation angle θ2 relative to the ball joint housing 108 and/or central axis 131 about any predetermined angularity of movement (for example, any 360 degree of orientation relative to the ball joint housing 108 and/or central axis 131 as illustrated in FIG. 3 by dashed line 135). The ball 124 and/or taper 126 can move at least angle θ2 as discussed herein along any degree of orientation discussed herein and as illustrated in FIG. 3 by dashed line 135.

As illustrated in FIGS. 4-6, the ball joint 102 can have a dust boot or protective membrane 136. The dust boot 136 is an optional feature of the ball joint 102 to provide additional protection from contaminants entering the interior of the ball joint 102 (e.g., a socket formed by the ball joint housing 108 within which ball 124 is retained). The dust boot 136 can be made of any flexible material (e.g., a flexible sheet or sheet having flexible portions such as at the bends) for the dust boot 136 to accommodate and allow movement of the ball and taper 122 relative to the ball joint housing 108 as discussed herein. In some embodiments, a grease seal 141 as discussed below can provide sufficient protection as a barrier against dust, debris, and/or foreign objects without the dust boot 136.

As illustrated, the dust boot 136 can have a dust ring, lip, or flange 138 designed to connect with the ball joint housing 108. The dust boot 136 can connect the dust ring 138 to maintain a desired overall position relative to the ball joint housing 108. The dust boot 136 can have a skirt 139 that is sized and shaped to be positioned about, circumscribe, and/or envelope the neck 128. The dust boot 136 connecting to the ball joint housing 108 and circumscribing the neck 128 in a substantially sealed engagement via the skirt 139 can help mitigate dust, debris, and/or foreign objects from entering inside the ball joint housing 108. The dust boot 136 can have folds 140 that allow the dust boot 136 to articulate with the ball joint housing 108 while the skirt 139 remains about the neck 128. Accordingly, certain folds 140 will be compressed while others will be flattened as the dust boot 136 moves with the ball joint housing 108 (or the ball and taper 122 moves relative to the ball joint housing 108). The dust boot 136 can be made of polyurethane and/or any other suitable material such as rubber to flex as the ball 124 articulates within the ball joint housing 108 as discussed herein.

To further facilitate mitigating dust, debris, and/or foreign objects from entering inside the ball joint housing 108 and provide a substantially sealed assembly (or in lieu of the dust boot 136), the ball joint 102 can have a grease seal 141. The grease seal 141 can extend from a part of the bottom portion 134 toward the ball 124. The grease seal 141 can come in contact with the ball 124 to provide a barrier against dust, debris, and/or foreign objects and mitigate mixing with the grease. The ball joint housing 108 can have a flange or projection 143 that the grease seal 141 connects to and/or extends from. The flange 143 can help further facilitate keeping a tight engagement of the internal components in the ball joint housing 108 as discussed herein as well as help keeping dust, debris, and/or foreign objects from entering the ball joint housing 108. The flange 143 can have a length or radial length L3 ranging from about 0.1 inches to about 0.5 inches and about 0.2 to about 0.4 inches, including the foregoing values and ranges bordering therein.

As illustrated in FIGS. 5 and 6, the ball joint 102 can have a lower or first race/seat 142 and an upper or second race/seat 144. The ball 124 can be positioned and retained in a desired position relative to and in the ball joint housing 108 via the first or lower race/seat 142 and the second or upper race/seat 144. The lower race 142 and the upper race 144 hold the ball 124 in the ball joint housing 108. The lower race 142 and the upper race 144 can be considered wear items that interface between the ball joint housing 108 and the ball 124 as the ball joint 102 articulates as discussed herein. The lower and upper races 142, 144 can be made of rigid material (such as metal) to facilitate the press fit of the ball joint components 102 as discussed herein. The lower race 142 can be positioned near or proximate to the grease seal 141. The lower race 142 can be positioned near, proximate to, or against (in contact with) the flange 143. The lower race 142 can facilitate desired movement of a portion of the ball 124 connected to the neck 128. The upper race 144 can be positioned near or proximate to the upper portion 112. The upper race 144 can facilitate desired movement of a portion of the ball 124 away from the neck 128 along the central axis 131.

As also illustrated in FIGS. 5 and 6, the ball joint 102 can have an O-ring or gasket 146 (e.g., upper preload seal). The O-ring 146 can be positioned against the upper race 144. When the ball joint 102 is assembled, the O-ring 146 can press against the upper race 144, which presses against the ball 124, which presses against the lower race 142, to hold in place and provide a tight assembly. The O-ring 146 can also act as a barrier to debris, dust, and/or foreign objects similarly to the grease seal 141 as discussed herein.

As illustrated in FIGS. 5 and 6, the ball joint 102 can include a retainer or grease plate 148 (e.g., grease cap plate). The retainer plate 148 can be retained in position and engaged by the ball joint housing 108 via lip 150 that curves inwards. When the ball joint 102 is assembled by pressing the lip 150 against retainer plate 148, the retainer plate 148 can press against the O-ring 146 and/or the upper race 144 to hold in place and provide a tight assembly of the ball joint 102 as discussed herein.

The ball joint 102 can also have a grease fitting 152. The grease fitting 152 can be inserted into an opening of the retainer plate 148. The grease fitting 152 can provide a port and/or valve for introducing and maintaining grease inside the substantially sealed assembly of the ball joint 102 (e.g., grease between the ball joint components 102 as discussed herein such as the ball 124, the lower race 142, and the upper race 144, and/or the O-ring 146).

Accordingly, the ball joint assembly 102 can be assembled and packed from bottom-up (e.g., from the flange 143 upwards). For example, the grease seal 141, the lower race 142, the ball 124, the upper race 144, the O-ring 146, and grease plate 148 can be inserted into the ball joint housing 108 substantially in that order (some of the order of components may be reversed or performed simultaneously). Upon insertion of these components, at least the lower race 142, the ball 124, and upper race 144 can press fit into the ball joint housing 108. The press or stress fit of these components into the ball joint housing 108 can push against the ball joint housing 108 to create a tight assembly of the ball joint 102. Such a tight assembly of the ball joint 102 can contribute to increased pullout force 153 (in for example the directions illustrated in FIGS. 4 and 6, but it will be understood that pullout force 153 can be oriented in any direction that the ball joint can articulate as discussed herein, corresponding to angle θ2 and/or angle θ3, including relative to the central axis 131) and resistance without the use of additional skirts, flanges, or sleeves protruding from the ball joint housing 108 (e.g., beyond or from the flange 143) to retain the ball 124 in the ball joint housing 108 up to a predetermined pull out force. For example, the ball joint 102 can have a pullout force of up to about 10,000, up to about 15,000, up to about 20,000, up to about 25,000, and up to about 30,000 lbs., including the foregoing values and ranges bordering therein, in any orientation or articulation of the ball joint 102 as discussed herein. The pullout force to separate the ball 124 from the ball joint housing 108 can be about 10,000, about 15,000, about 20,000, about 25,000, and about 30,000 lbs., including the foregoing values and ranges bordering therein, in any orientation or articulation of the ball joint 102 as discussed herein. The ball joint 102 can have a pullout force of at least about 6,800, at least about 8,000, at least about 10,000, at least about 15,000, at least about 20,000, at least about 25,000, and at least about 30,000 lbs. including the foregoing values and ranges bordering therein, in any orientation or articulation of the ball joint 102 as discussed herein. The ball joint 102 can have a pullout force of about 6,800 to about 30,000, including about 6,800 to about 25,000, including about 10,000 to about 30,000, including about 10,000 to about 25,000, including about 10,000 to about 20,000, including about 10,000 to about 15,000, including about 15,000 to about 30,000, including about 15,000 to about 25,000, including about 15,000 to about 20,000 lbs., including the foregoing values and ranges bordering therein, in any orientation or articulation of the ball joint 102 as discussed herein.

FIG. 7 illustrates a side view of an embodiment of a ball joint assembly 102. FIG. 8 illustrates an enlarged side view of an embodiment of the ball joint housing 108. As illustrated in FIGS. 7 and 8, the upper portion 112 of the ball joint housing 108 can have two portions. The upper portion 112 can have a first portion or part 112' and a second portion or part 112". The first portion 112' can have the outer surface 123 that is proximate to an inner surface of the control arm housing 106 as discussed herein.

As illustrated, the second portion 112" can have a smaller outer diameter D5 relative to the outer diameter D2 of the first portion 112'. The outer diameter D5 (two times R5) can range from about 0.4 to about 2.4 inches, about 0.7 to about 1.9 inches, and about 0.9 to about 1.565 inches, including the foregoing values and ranges bordering therein. The first portion 112' can have a width W2' ranging from about 0.05 to about 1.0 inches, about 0.2 to about 0.7 inches, about 0.3 to about 0.5 inches, including the foregoing values and ranges bordering therein. The second portion 112" can have a width W2" ranging from about 0.01 to about 1.0 inches, about 0.2 to about 0.7 inches, about 0.3 to about 0.5 inches, including the foregoing values and ranges bordering therein.

The first portion 112' and the second portion 112" can be connected by a ledge, step, and/or rest 154. The first portion 112' and the second portion 112" can have chamfers, edges, corners, fillets, and/or bevels to facilitate engagement with other components as discussed herein, and in particular, as discussed herein for ledge 116.

The second portion 112" can have an outer surface 156 that fits against, rests against, frictionally engages, and/or is proximate to a cap that can be provided with the ball joint assembly 102. An inner surface of the cap can rest against the outer surface 156. A portion or lower portion of the cap can rest against the ledge 154. The cap can be provided with the ball joint assembly 102 for aesthetic purposes. For example, the cap can have various colors and/or marks to identify or match the ball joint assembly 102. The cap can also at least partially cover the grease fitting 152 to help protect the grease fitting 152.

FIG. 9 illustrates a side view of embodiments of a ball joint 102 and a control arm housing 106. FIG. 10 illustrates a cross-sectional view of embodiments of the ball joint 102 and the control arm housing 106. FIG. 11 illustrates an enlarged side cross-sectional view of an embodiment of the ball joint 102 and the control arm housing 106. FIGS. 9-11 illustrates the ball joint 102 inside the control arm housing 106 as discussed herein.

As illustrated in FIG. 10, the ball joint 102 can have an articulation angle θ3. The angle θ3 can correspond to a predetermined range of angularity for movement of the ball and taper 122 relative to the ball joint housing 108. The angle θ3 can correspond to the angle θ2 as discussed herein. The angle θ3 can vary from about 15° to about 60°, about 17.5° to about 50°, about 30° to about 45°, including the foregoing values and ranges bordering therein, and can be up to about 35°, up to about 40°, up to about 45°, up to about 50°, and up to about 60°, including the foregoing values and ranges bordering therein, in substantially any orientation or range of movement of the ball and taper 122 relative to the ball joint housing 108. The angle θ3 as illustrated in FIG. 10 can be about 35°, about 40°, about 45°, about 50°, and about 60°, including the foregoing values and ranges bordering therein, in substantially any orientation or range of movement of the ball and taper 122 relative to the ball joint housing 108. The angle θ3 as illustrated in FIG. 10 can be at least about 35°, at least about 40°, at least about 45°, at least about 50°, and at least about 60°, including the foregoing values and ranges bordering therein, in substantially any orientation or range of movement of the ball and taper 122 relative to the ball joint housing 108. An included angle of articulation angle θ3 is double the angle θ3. For example, when angle θ3 is 40, the included angle is 80° in any direction (e.g., any orientation of ball and taper 122 relative to the ball joint housing 108 when articulated to the full extent in opposite directions across the central axis 131). Angle θ3 can be substantially uniform or same about the central axis 131 to allow for the high angularity of movement as discussed herein in substantially any orientation of the ball joint housing 108 (for example, any 360 degree rotation position relative to the central axis 131, which can correspond to an orientation relative to the vehicle). FIG. 3 illustrates, for example, any 360 degree rotation position with dashed line 133 about the control arm housing 106 and/or ball joint housing 108 (including about the central axis 131 as discussed herein). In some embodiments, angle θ3 can be substantially uniform or same about the central axis 131 to allow for the high angularity of movement as discussed herein in substantially in at least about 90 degrees, at least about 180 degrees, or all about 360 degrees, including about 90 to about 180 degrees, including about 120 to about 210, including about 150 to about 240, and including about 180 to about 360, including the foregoing values and ranges bordering therein, of rotation or position relative to the central axis 131, which can correspond to an orientation relative to the vehicle.

As discussed herein, the various dimensions and angles can be varied depending on the (aftermarket) control arm that is being retrofitted with the ball joint 102. The ball joint 102 can have an adapter system as discussed herein designed to connect to a certain control arm by specifically designing some of the features of the ball joint housing 108 such as radius R1, radius R2, radius R3, radius R4, radius R5, length L1, length L2, thickness T1, thickness T2, width W1, width W2, width W3, and/or angle θ1 to engage, connect, and/or mate with the certain control arm (e.g., control arm housing) while providing the desired high angularity or displacement corresponding to θ2 and θ3 as discussed herein. For example, the adapter system of the ball joint 102 for mounting to control arms can include the features of radius R1, radius R2, radius R3, radius R5, length L1, width W1, width W2, width W3, chamfer 114, ledge 116, chamfer 118, outer surface 121, outer surface 123, outer surface 156, ledge 154, and/or etc. as discussed herein, which can be varied based on the control arm housing 106 that the ball joint 102 is being retrofitted to connect to and function with. Concomitantly, the ball joint 102 can be designed to have a certain desired or predetermined angularity corresponding to θ2 and θ3 by designing some of the features of the ball joint housing 108 such as of R1, R2, R3, R4, L1, L2, T1, T2, W1, W2, W3, and/or θ1 to provide clearance for movement of the ball joint housing 108 relative to the ball and taper 122 as discussed herein.

As illustrated in FIGS. 10 and 11, the control arm housing 106 can have an annular cutout, indent, and/or divot 158. The cutout 158 can be sized and shaped to connect, engage, and/or mate with a retainer ring 160. The retainer ring 160 can be an annular disc shaped like a washer made with spring steel or suitable material with elasticity to be positioned in and connect to the control arm housing 106 as discussed herein. An opening in the retainer ring 160 can be sized and shaped to circumscribe the ball 124, the neck 128, and/or shoulder 130. The retainer ring 160 can help position and/or retain the ball joint assembly 102 relative to the control arm housing 106. For example, upon insertion of the ball joint housing 108 into the control arm housing 106 as discussed herein, the retainer ring 160 can be positioned in the cutout 158 to facilitate desired engagement and relative positions of the ball joint housing 108 and the control arm housing 106. The retainer ring 160 can be made or formed from relatively substantially rigid material to secure the ball joint housing 108 relative to the control arm housing 106. The retainer ring 160 can have an opening to allow full articulation of the ball and taper 122 relative to the control arm housing 106 as discussed herein while, for example, substantially not contacting (e.g., being relatively proximate) or unconstructively contacting the ball and taper 122 in any articulation angle θ3.

In some embodiments, the retainer ring 160 can have elastic material or be part of the dust boot 136 as discussed herein that flexes and moves with the ball and taper 122 relative to the ball joint housing 108. For example, when the ball and taper 122 articulates relative to the ball joint housing 108, some portions of the retainer ring 160 and/or the dust boot 136 can flex and move to accommodate various portion or parts of the ball and taper 122. Some portion of the retainer ring 160 and/or the dust boot 136 can flex to be positioned on or against surfaces of the ball 124, neck 128, and/or shoulder 130 as the ball and taper 122 articulates relative to the ball joint housing 108.

As also illustrated in FIG. 11, the ball and taper 122 can articulate to an extent such that a surface of the taper 126 is relatively proximate or substantially in contact with a surface of the control arm housing 106. The articulation angle θ3 corresponds to a high enough angle of the ball joint 102 such that a surface of the taper 126 is relatively proximate or substantially in contact with a surface of the control arm housing 106. As illustrated in FIG. 11, the central axis 131 as discussed herein can be considered a central axis of the ball joint housing 108 with the ball 124 and/or taper 126 (for example, ball and taper 122) pivoting or moving the articulation angle θ3 relative to the ball joint housing 108 and/or central axis 131 about any predetermined angularity of movement (for example, any 360 degree of orientation relative to the ball joint housing 108 and/or central axis 131 as illustrated in FIG. 3 by dashed line 135). The ball 124 and/or taper 126 can move at least angle θ3 as discussed herein along any degree of orientation discussed herein and as illustrated in FIG. 3 by dashed line 135.

In some embodiments, some portions of the retainer ring 160 and/or dust boot 136 can also further help facilitate keeping debris and/or other foreign objects from the ball joint assembly 102. The retainer ring 160 can have similar functions to the dust boot 136 and/or the grease seal 141 as discussed herein. The retainer ring 160 can substitute and/or be the dust ring 138 of the dust boot 136 as discussed herein. Accordingly, the dust boot 136 can connect to the retainer ring 160 and function as discussed herein.

As illustrated in FIG. 11 (see also FIG. 6), the grease seal 141 can have a positioning ring 162. The positioning ring 162 can be made of substantially rigid material to help position the grease seal 141 in a desired position relative to the ball 124. The positioning ring 162 can be positioned and/or sandwiched between the lower race 142 and the flange 143 to position the grease seal 141 in a predetermined or desired position in the ball joint assembly 102 relative to the ball 124. The grease seal 141 can be made from elastic material to tightly fit against the ball 124 and mitigate foreign debris from entering the ball joint assembly 102 as discussed herein.

As also illustrated in FIG. 11, the ball 124 can have cutouts, indentations, channels, and/or divots 164 to carry, house, and/or retain as well as distribute the grease once the ball joint assembly 102 has been greased. The grease can reside in and move with the cutouts 164, helping distribute the grease throughout the ball joint assembly 102 when the ball 124 moves relative to the ball joint housing 108. The cutouts 164 can also house any foreign debris that may enter the ball joint assembly 102. For example, when foreign debris enters the ball joint assembly 102, the foreign debris may be pushed and moved into the cutouts 164 to help reduce wear of the other components of the ball joint assembly 102 by residing in the cutouts 164 rather than being between the components of the ball joint assembly 102 (e.g., the ball 124 and the lower and upper races 142, 144) and causing excessive wear and tear during movement of the ball 124 relative to the ball joint housing 108.

FIGS. 12A-D illustrate side views of embodiments of various ball joint assemblies 102 as discussed herein. FIGS. 12A-D illustrate various configurations and dimensions as discussed herein. The ball joint assemblies 102 illustrated in FIGS. 12A-D can have any range of dimensions and angles as discussed herein.

Various embodiments and examples of assemblies have been disclosed. Although the assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above.

What is claimed is:

1. A ball joint assembly for a vehicle suspension, the ball joint assembly comprising:
    a control arm configured to connect to a frame of a vehicle;
    a ball;
    a taper connected to the ball, the taper configured to connect to a steering knuckle that connects to a wheel of the vehicle;
    a housing comprising an adapter system configured to connect to the control arm, the ball at least partially in the housing with grease at least partially between the ball and the housing, the housing configured to retain the ball in the housing with a pullout force of at least 10,000 lbs., the adapter system comprising:
        a first portion having a first axial extent and a first outer diameter, the first portion configured to be positioned at least partially in a control arm housing of the control arm; and
        a second portion connected to the first portion, the second portion having a second axial extent less than the first axial extent and a second outer diameter less than the first outer diameter; and
    a grease seal positioned within the housing extending from the first portion toward the ball, the grease seal directly contacting the ball to provide a barrier against debris,
    wherein the housing, the ball, and the taper are configured for the ball to articulate relative the housing in all 360 degrees of orientation,
    wherein the housing, the ball, and the taper are configured for the housing and the ball to articulate relative to each other to provide a predetermined angularity of movement in all 360 degrees of orientation, and
    wherein the pullout force is at least 10,000 lbs. in all 360 degrees of orientation.

2. The ball joint assembly of claim 1, wherein an outer surface of the first portion and an outer surface of the second portion circumscribe a central axis of the housing.

3. The ball joint assembly of claim 1, wherein the adapter system comprises a ledge extending radially between the first and second portions, the ledge configured to rest against a corresponding surface of the control arm.

4. The ball joint assembly of claim 3, wherein a radial extent of the ledge is 0.2 to 2 inches.

5. The ball joint assembly of claim 1, wherein the predetermined angularity of movement corresponds to the housing and the ball being capable of articulating relative to each other is at least 40 degrees from a central axis along the housing in all 360 degrees of orientation.

6. The ball joint assembly of claim 1, wherein the housing is configured to retain the ball in the housing with a pullout force of at least 15,000 lbs.

7. The ball joint assembly of claim 1, wherein the housing comprises a flange from which the grease seal extends, the flange extending toward the ball from the first portion of the housing.

8. The ball joint assembly of claim 1, further comprising a positioning ring contacting the grease seal, the positioning ring being rigid to position the grease seal relative to the ball.

9. The ball joint assembly of claim 1, wherein the first portion is proximate to the taper relative to the second portion.

10. A ball joint assembly for a vehicle suspension, the ball joint assembly comprising:
a ball;
a taper connected to the ball, the taper configured to connect to a steering knuckle of a vehicle suspension;
a housing comprising an adapter system configured to connect to a control arm of the vehicle suspension, the ball at least partially in the housing with grease at least partially between the ball and the housing, the adapter system comprising:
a first portion having a first axial extent and a first outer diameter, the first portion configured to be positioned at least partially in a control arm housing of the control arm; and
a second portion connected to the first portion, the second portion having a second axial extent less than the first axial extent and a second outer diameter less than the first outer diameter; and
a grease seal extending between the first portion and the ball, both ends of the grease seal being axially within the housing, the grease seal configured to provide a barrier from debris.

11. The ball joint assembly of claim 10, wherein the first portion comprises an outer surface extending parallel to or along a central axis of the housing, and wherein the second portion comprises an outer surface extending parallel or along a central axis of the housing.

12. The ball joint assembly of claim 11, wherein the outer surfaces of the first and second portions are cylindrical about the central axis.

13. The ball joint assembly of claim 10, wherein the first outer diameter is 1.5 to 3.5 inches.

14. The ball joint assembly of claim 10, wherein the second outer diameter is 0.5 to about 2.5 inches.

15. The ball joint assembly of claim 10, wherein the first axial extent is 0.4 to 2.0 inches.

16. The ball joint assembly of claim 10, wherein the second axial extent is 0.05 to 1.5 inches.

17. The ball joint assembly of claim 10, wherein the housing, the ball, and the taper are configured for the housing and the ball to articulate relative to each other to provide a predetermined angularity of movement in all 360 degrees of orientation.

18. The ball joint assembly of claim 17, wherein the predetermined angularity of movement corresponds to the housing and the ball being capable of articulating relative to each other at least about 35 degrees from a central axis along the housing in all 360 degrees of orientation.

19. A ball joint assembly for a vehicle suspension, the ball joint assembly comprising:
a ball;
a taper connected to the ball, the taper configured to connect to a steering knuckle of a vehicle suspension; and
a housing configured to connect to a control arm of the vehicle suspension, the ball at least partially in the housing and at least partially sealed by a grease seal, the housing configured to retain the ball in the housing with a pullout force of at least 6,800 lbs.,
wherein the grease seal is positioned fully within the housing,
wherein the housing, the ball, and the taper are configured for the ball to articulate relative the housing in at least 180 degrees of orientation,
wherein the housing, the ball, and the taper are configured for the housing and the ball to articulate relative to each other to provide a predetermined angularity of movement in the at least 180 degrees of orientation, and
wherein the pullout force is at least 6,800 lbs. in the at least 180 degrees of orientation.

20. The ball joint assembly of claim 19, wherein the predetermined angularity of movement corresponds to the housing and the ball being capable of articulating relative to each other at least 30 degrees from a central axis along the housing in the at least 180 degrees of orientation.

21. The ball joint assembly of claim 19, wherein the pullout force is at least 20,000 lbs. in the at least 180 degrees of orientation.

22. The ball joint assembly of claim 19, further comprising a neck connecting the ball to the taper, the neck having a predetermined length to provide clearance for the housing and the ball articulate relative to each other, wherein the predetermined length of the neck is 0.1 to 2.2 inches.

23. The ball joint assembly of claim 22, wherein the neck comprises a diameter of 0.4 to 0.8 inches.

* * * * *